United States Patent [19]

Kuhn

[11] Patent Number: 4,942,811
[45] Date of Patent: Jul. 24, 1990

[54] FAT-REMOVING CULINARY IMPLEMENT

[76] Inventor: James O. Kuhn, 140 Nassau St., New York, N.Y. 10038

[21] Appl. No.: 273,594

[22] Filed: Nov. 21, 1988

[51] Int. Cl.⁵ .................. A47L 13/20; A47J 43/28
[52] U.S. Cl. .................... 99/495; 15/119 R; 15/228; 99/456
[58] Field of Search .......... 99/495, 456, 496, 457, 99/497; 15/119 R, 228, 210 R, 229.1

[56] References Cited

U.S. PATENT DOCUMENTS

| | | | |
|---|---|---|---|
| 285,003 | 9/1883 | Bowen | 15/119 R |
| 549,688 | 11/1895 | Sanford | 15/119 R |
| 631,250 | 8/1899 | Gahlau | 15/119 R |
| 1,783,879 | 12/1930 | Kenner | 15/119 R |
| 1,877,054 | 9/1932 | Ross | 15/119 R |
| 2,269,424 | 1/1942 | Bernstein | 15/228 |
| 3,748,682 | 7/1973 | Rhodes | 15/229.1 |
| 3,881,211 | 5/1975 | Rhodes | 15/225 |
| 3,999,232 | 12/1976 | Page | 15/229.1 |
| 4,587,154 | 5/1986 | Hotchkiss | 15/209 R |

*Primary Examiner*—Timothy F. Simone
*Attorney, Agent, or Firm*—Michael Ebert

[57] ABSTRACT

A culinary implement capable of functioning as a mop to extract from an aqueous food mixture insoluble liquid fats dispersed therein. The implement is provided with a handle attached to a holder supporting a porous fabric pad formed of non-woven continuous filament polyester fibers having both hydrophobic and lipophilic properties. When the implement is used to mop the mixture, the fats dispersed therein are attracted and adhere to the pad whereas the aqueous mixture filters therethrough, thereby making it possible to free the food mixture of its fat content.

5 Claims, 1 Drawing Sheet

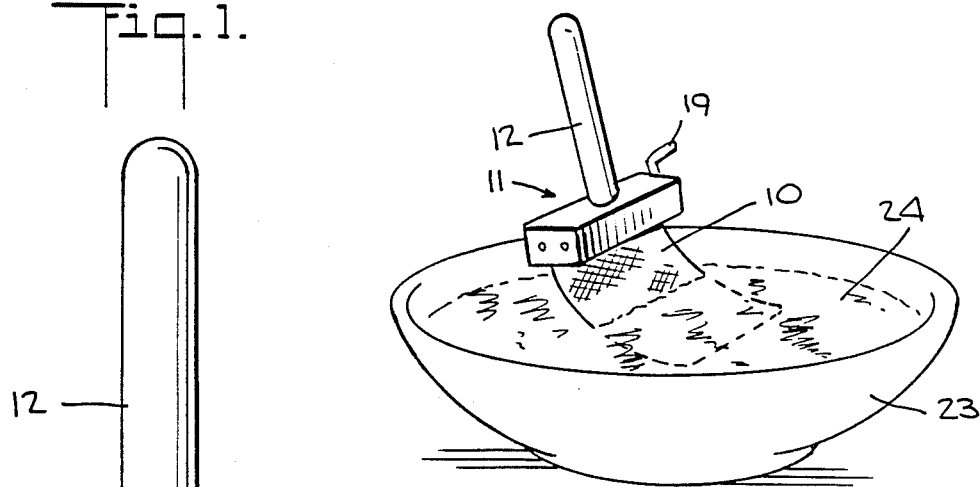
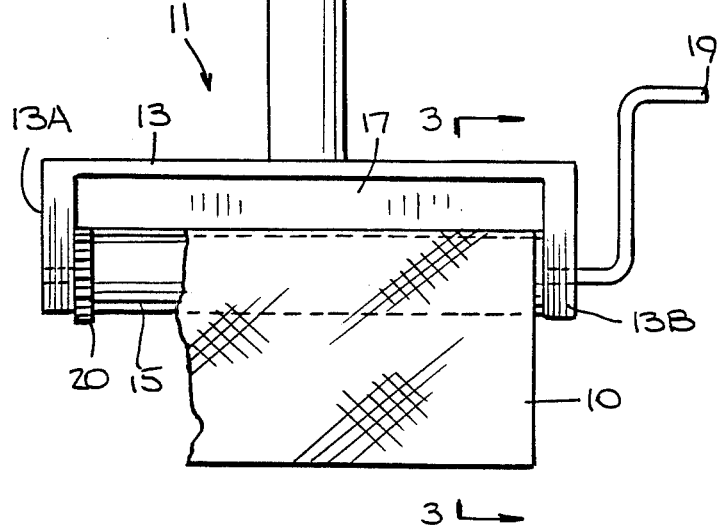
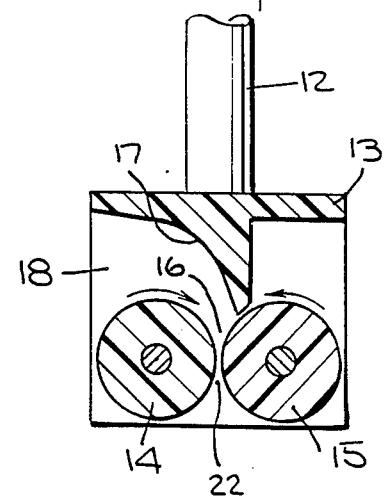
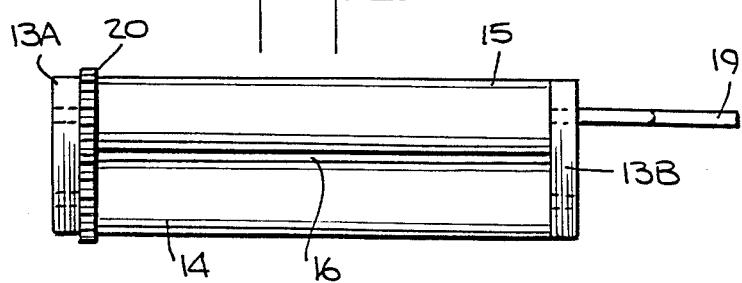

FAT-REMOVING CULINARY IMPLEMENT

BACKGROUND OF INVENTION

1. Field of Invention:

This invention relates generally to devices for extracting liquid lipids from aqueous food products, and more particularly to a culinary implement capable of extracting liquid fats from an aqueous food mixture having fats dispersed therein.

2. Status of Art:

Lipid is an all-inclusive term for fats and fat-like substances. It includes all materials that are relatively insoluble in water but are soluble in fat solvents such as acetone.

Modern nutritionists are greatly concerned with fats in the diet, for these play an important role in the cholesterol level in the blood. Current dietary guidelines recommend that the fat intake be cut down in order to reduce the risk of heart disease and possibly cancer. While there is some question as to the extent to which fats contribute to cholesterol level, for this depends on the nature of the fat, there is no argument as to the high caloric content of fats. Thus, to avoid obesity, modern "nouvelle cuisine" and "lean meal" diets are low in fat.

Fats fall into two general classes, for a fat is either saturated or unsaturated. Saturated fats are solid at room temperature, such as those prevalent in meats, butter and cheese. These fats become liquid only when heated. Unsaturated fats are those which are liquid at room temperature and include polyunsaturated fats, such as soybean oil and corn oil, and monounsaturated fats such as olive oil and peanut oil.

While the present informed view is that some unsaturated fats have beneficial effects, whereas most unsaturated fats, save in relatively small quantities, are not to be recommended, regardless of their nature fats usually have a very high caloric content. It is therefore generally desirable, in the interest of weight control, to remove most of the fats from the prepared food.

Thus, in preparing chicken soup by boiling a chicken in water to which diced vegetables may have been added, the resultant soup is an aqueous mixture which is rich in chicken fat. Because the fat is insoluble, it is dispersed in the soup and much of it floats on the surface. The present practice is to extract the fat by skimming the surface of the soup. This is a relatively messy and time consuming procedure, particularly when the soup is being prepared in large quantities in a restaurant or commissary.

And in preparing meat dishes of various kinds in a pot in which saturated fat from the heated meat is liquefied, a similar problem arises if one wishes to remove liquid fat from the pot.

SUMMARY OF INVENTION

In view of the foregoing, the main object of this invention is to provide a culinary implement capable of extracting liquid fats from an aqueous food mixture having insoluble fats dispersed therein.

More particularly, an object of this invention is to provide an implement of the above type which makes use of a permeable fabric filter pad having both hydrophobic and lipophilic properties, whereby as the pad is swept through the solution, the fats adhere thereto while the mixture filters therethrough.

Also an object of this invention is to provide an implement of the above type which has an exceptionally high capacity for fats.

Yet another object of this invention is to provide a low cost implement of the above type which is non-reactive with food products and which operates efficiently and reliably.

Briefly stated, these objects are attained in a culinary implement capable of functioning as a mop to extract from an aqueous food mixture insoluble liquid fats dispersed therein. The implement is provided with a handle attached to a holder supporting a porous fabric pad formed of non-woven, continuous filament, polyester fibers having both hydrophobic and lipophilic properties. When the implement is used to mop the mixture, the fats dispersed therein are attracted and adhere to the pad whereas the mixture filters therethrough, thereby making it possible to free the food mixture of its fat content.

In a preferred embodiment, the holder is provided with cooperating pressure rollers that define a nip for receiving the pad, the rollers being turnable in one direction to admit the pad into the nip, and in the reverse direction to squeeze fat out of the pad.

BRIEF DESCRIPTION OF DRAWINGS

For a better understanding of the invention as well as other objects and further features thereof, reference is made to the following detailed description to be read in conjunction with the accompanying drawings, wherein:

FIG. 1 is an elevational view of a culinary implement in accordance with the invention provided with a fat-removing pad;

FIG. 2 is a plan view of the cooperating rollers which retain the pad;

FIG. 3 is a transverse section taken through the holder showing the rollers in relation to a guide plate which leads the pad into a nip between the rollers; and FIG. 4 is a perspective view of the implement when used to mop fat from a food mixture contained in a bowl.

DESCRIPTION OF INVENTION

Referring now to FIG. 1, there is shown a culinary instrument according to the invention comprising a compressible, porous fabric pad 10 clamped by a holder, generally designated by numeral 11, to which is attached a handle 12.

which is chemically inert and non-reactive with food products, the material having both hydrophobic and lipophilic or oleophilic properties. A fabric that we have found that satisfies these requirements is "Trevira" manufactured by Hoechst Celanese Corporation. This non-woven fabric is formed of spun-bond, continuous filament polyester fibers which are needlepunched to form a compressible pad. Trevira is currently used for soil stabilization, for drainage on highways, airport runways and in other construction applications.

We have discovered that with Trevira and other polyester fabrics having comparable hydrophobic and lipophilic properties, the fabric is permeable to water and does not absorb this liquid. While this makes the fabric suitable in barrier applications requiring water drainage, they exhibit an altogether different characteristic in regard to liquid lipids, for the polyester fibers which reject water have a strong affinity for lipids and are therefore lipophilic or oleophilic. Pad 10 may be formed of any compressible filament material such as a pad formed of polypropylene fibers which is nonreactive with food products thas has both hydrophobic and lipophilic properties.

Holder 10 is formed by a yoke 13 having a pair of arms 13A and 13B formed by square plates between which are supported for rotation rollers 14 and 15 of like diameter in parallel relation. The space between the rollers define a nip 16 whose gap size is somewhat smaller than the thickness of pad 10. Frame 13 is provided with an internal guide plate 17 defining a curved inlet 18 leading into the upper end of nip 16.

The shafts of rollers 14 and 15 are journalled in bearings formed in arms 13A and 13B of the yoke, one end of the shaft for roller 15 being coupled to a hand crank 19. Mounted on the other end of the shaft for roller 15 adjacent arm 13A is a gear 20 which meshes with a like gear 21 on the shaft of roller 14.

Roller 14 is formed with a compressible outer layer of rubber or similar elastomeric material, while roller 15 is molded of hard, synthetic plastic material such as polypropylene or nylon. When crank 19 is turned to rotate roller 15 in the counterclockwise direction, as indicated by the arrow in FIG. 4, roller 14 which is gear coupled thereto is then caused to turn concurrently in the clockwise direction. When pad 10 is introduced into nip 16 through inlet 18 and is compressed between the rotating rubber rollers 14 and 15 it is then advanced through outlet 22 of the nip until most of the pad is extended from the holder to form a mop. Reversing the turning direction of crank 19 causes the pad to retract.

As shown in FIG. 4, when pad 10 of the culinary implement is immersed in a bowl 23 containing an aqueous food mixture 24, such as soup having fats dispersed therein and is swept back and forth in this mixture, the non-soluble fats therein will be attracted to and adhere to the pad, while the aqueous mixture will filter through the pad and not be absorbed thereby.

In practice, one can, in a matter of seconds, scoop up virtually all of the fats in the aqueous mixture, assuming that it is in a typical cooking pot, without picking up any of the water After the implement whose pad is loaded with fat is removed from the solution, the fat can be squeezed out of the pad and the pad then cleaned with detergent so that it can be used again. "Trevira," which comes in different thicknesses, has high tear and burst strength and has a long effective life as a mop, in accordance with the invention, for fat extraction.

In some situations, the amount of fat dispersed in an aqueous food solution is so great that it exceeds the fat holding capacity of the fabric pad. In that event, after pad 10 is loaded with fat, one can squeeze the fat out of the pad by running the pad in reverse through the pressure rollers. In this way, it is possible, using the same pad 10, to remove several loads of fat from the mixture until all fat is extracted therefrom.

While there has been shown and described a preferred embodiment of a fat-removing culinary implement in accordance with the invention, it will be appreciated that many changes and modifications may be made therein without, however, departing from the essential spirit thereof. Thus, the holding means for the pad may take the form of a pair of spring-biased plates between which one end of the pad is sandwiched.

I claim:

1. A culinary implement functioning as a mop to extract from an aqueous food mixture insoluble liquid fats dispersed therein, said implement comprising:
   (A) a porous fabric pad having a predetermined thickness formed of compressible filtration material having both hydrophobic and lipophilic properties;
   (B) a holder for the pad; and
   (C) a handle attached to the holder to form a mop, whereby when the implement is used to sweep the mixture, the fats disposed therein are attracted and adhere to the pad whereas the aqueous food mixture filters therethrough, thereby making it possible to free the food mixture of its fat content, said holder being provided with a pair of rollers having a space therebetween to define a nip for receiving the pad, said nip having a gap whose size is somewhat smaller than the thickness of the pad, said rollers being supported at fixed parallel positions for rotation on shafts between the opposing arms of a yoke, the shaft of one of said rollers being coupled to a hand crank, whereby when one end of the pad is received and compressed in the nip, the remaining portion thereof extends therefrom to form a flat mop which may be swept back and forth in the food mixture.

2. An implement as set forth in claim 1, wherein the fibers forming the pad are non-woven, continuous polyester filaments.

3. An implement as set forth in claim 1, wherein said rollers are of the same diameter and are provided at corresponding ends thereof with intermeshing gears whereby when said crank is turned, the rollers are caused to rotate in opposite directions.

4. An implement as set forth in claim 3, wherein one of said rollers is formed with an outer layer of elastomeric material.

5. An implement as set forth in claim 4, wherein the other roller is molded of hard, synthetic plastic material.

* * * * *